United States Patent Office 3,701,741
Patented Oct. 31, 1972

3,701,741
PURIFICATION OF IMPURE SCRAP POLY(ETHYLENE TEREPHTHALATE)
Max F. Meyer, Jr., Robert L. Combs, and Willis C. Wooten, Jr., Kingsport, Tenn., assignors to Eastman Kodak Company, Rochester, N.Y.
No Drawing. Filed Feb. 1, 1971, Ser. No. 111,651
Int. Cl. C08g 53/22
U.S. Cl. 260—2.3　　　　　　　　　　　　　　　10 Claims

ABSTRACT OF THE DISCLOSURE

A process for the recovery of substantially pure poly(ethylene terephthalate) from scrap poly(ethylene terephthalate) contaminated with impurities which comprises dissolving the contaminated poly(ethylene terephthalate) at elevated temperatures and under superatmospheric pressure in a volatile solvent in which said poly(ethylene terephthalate) is insoluble at ambient temperatures but soluble at elevated temperatures, said solvent having an atmospheric boiling point of about $-104°$ C. to $100°$ C. and being aliphatic alcohols or mixtures thereof; filtering off impurities; precipitating finely divided poly(ethylene terephthalate) by slowly cooling the resulting solution while maintaining the solution under superatmospheric pressure and at a substantially constant volume; and recovering said substantially pure poly(ethylene terephthalate) by a second filtration step.

---

This invention relates to the recovery of substantially pure poly(ethylene terephthalate) from contaminated or impure poly(ethylene terephthalate).

The use of poly(ethylene terephthalate) in film and fiber applications has increased tremendously in the past several years to the point where hundreds of millions of pounds of the polyester are being produced and consumed annually. Inevitably, there is rejected or contaminated polymeric material which is left over from the processing operations. In view of the tremendous quantities of poly(ethylene terephthalate) being produced and consumed, there is likewise a correspondingly large amount of poly(ethylene terephthalate) scrap material. Because such huge quantities are involved, it is economically unattractive to discard the scrap polymer. However, it is relatively expensive and sometimes impossible to grind up the scrap so as to place it in a usable form. In addition, the usual grinding techniques do not provide any complete means for cleaning up the scrap polymeric material.

Recovery of scrap polymer has been attempted by placing it in a solution from which the impurities may be more easily removed. However, the conventional solvents for poly(ethylene terephthalate) are very difficult, if not impossible, to remove from the polymer in a later step. Additionally, such materials, e.g., trifluoracetic acid, have a deleterious effect on the electrical properties and the stability of a polymer.

Recovery of valuable products from scrap poly(ethylene terephthalate) is accomplished by the regeneration of dimethyl terephthalate and ethylene glycol by depolymerization of the polymer to its monomer units (U.S. 3,403,115; U.S. 3,037,050; U.S. 3,148,208; and U.S. 3,488,298). This technique, however, only gives the pure monomer back and does not give any pure polymer as a product.

A process for the recovery of substantially pure poly(ethylene terephthalate) from contaminated or impure scrap poly(ethylene terephthalate) has now been found which avoids the aforementioned drawbacks of prior art processes. In accordance with the process according to this invention, the poly(ethylene terephthalate) contaminated with impurities is dissolved at elevated temperatures and under superatmospheric pressure in a volatile solvent in which said polymer is substantially insoluble at ambient temperatures but soluble at elevated temperatures, said solvent having an atmospheric boiling point of about $-104°$ C. to about $100°$ C. and being selected from the group consisting of aliphatic alcohols and mixtures thereof. After filtering off the insoluble impurities, poly(ethylene terephthalate) substantially free of said impurities is precipitated from the solution by slow cooling of the solution while maintaining it under superatmospheric pressure and at a substantially constant volume.

It has surprisingly been found that volatile aliphatic alcohols, which materials have been previously considered to be non-solvents for and reactants to degrade poly(ethylene terephthalate), will dissolve the polymer at elevated temperatures and pressures. In addition, it has been found that upon cooling the solution in accordance with the process of the invention, the poly(ethylene terephthalate) precipitates as a fine, substantially pure, homogeneous powder. Also unexpectedly, active polymer rather than monomers is recovered if the polymer is precipitated within four hours of the initial dissolving step. Thus, a quick and efficient method for recovering substantially pure poly(ethylene terephthalate) from scrap poly(ethylene terephthalate) is provided by the process of the invention. Recovery of the precipitated polymer may be effected by filtering the solution while it is hot to remove insoluble contamination and/or impurities and the cooled solvent may be filtered off after the polymer has precipitated so as to remove oils or liquid contamination that are soluble in the solvent. Additionally, the hot solution of poly(ethylene terephthalate) may be treated with a solid adsorbent, such as charcoal, to remove color or other contamination. The volatile solvent may then be flashed off by reducing the pressure, recycled and reused. Since the substantially pure poly(ethylene terephthalate) is recovered by the process of the invention in the form of a finely divided, homogeneous powder, it may be employed in melt extrusion processes, whereas ordinary scrap polymer is too highly contaminated for usage in a melt process.

Fluidized powder beds are used to prepare high inherent viscosity polyesters. It has been found that these recovered powders according to this process are still active and may be built up to an even higher inherent viscosity then that of the original polymer in a fluidized bed. This is a great advantage since many properties are improved by having a higher inherent viscosity, and it is expensive to grind polymer in pellets or other larger sized particles to the proper size for the fluidized bed build-up process.

The solvents of the present invention include the volatile aliphatic, i.e., acyclic, alcohols which have a boiling point below $100°$ C. at normal atmospheric pressure, i.e., 760 mm. of Hg, preferably about $65°$ C. to about $100°$ C. Suitable aliphatic alcohols include methyl alcohol, ethyl alcohol, normal propanol and isopropanol. Mixtures of other liquids and aliphatic alcohols may be suitably employed, if desired. The more volatile solvents, such as methyl alcohol, are preferred since the recovered poly(ethylene terephthalate) can be easily dried when such is the solvent. As previously mentioned, the poly(ethylene terephthalate) is insoluble in the solvents of this invention at lower temperatures and pressures.

The impure or scrap poly(ethylene terephthalate) which may be treated according to the process of this invention can be amorphous, crystalline or crystallizable poly(ethylene terephthalate). The terms "crystalline" and "crystallizable" as used herein mean that the solid polymer has a melting point or that it develops a melting point upon annealing of at least about 200° C. There is no limit on the molecular weight of the polymer except as limited by the melting point. Conventionally, poly(ethylene terephthalate) is produced by the reaction of terephthalic acid and ethylene glycol and processes for producing the polymer are disclosed in U.S. Pat. Nos. 2,465,319; 2,727,881; 2,901,466; and 3,254,055. The poly(ethylene terephthalate) treated in accordance with the present invention is solid poly(ethylene terephthalate) which is impure or contaminated with impurities such as dirt, grime, oil, grease, metals, color bodies, etc. Although the invention may find its greatest value in the recovery of pure poly(ethylene terephthalate) from scrap poly(ethylene terephthalate), that is, polymer articles which have been used, contaminated with impurities, and discarded, it is not necessarily limited thereto.

Temperatures which may be employed in the solubilizing of the poly(ethylene terephthalate) include those temperatures in the range of between about 150° C. and about 240° C., preferably in the range of between about 170° C. and about 200° C. It is important to be below the critical temperature of the solvent used. The superatmospheric pressure employed is the autogeneous pressure of the solvent at the temperature employed to dissolve the polymer. It is important the the polymer remain in solution no longer than four hours since longer times will degrade the polymer and produce monomer. Also, the presence of water, acids or bases will produce monomers rather than recovered polymer.

The degree of crystallinity of the poly(ethylene terephthalate) may have an effect on the solubility of the polymer in the solvents of this invention. In some cases, temperatures as low as about 125° C. are suitable for dissolving amorphous forms of poly(ethylene terephthalate) while a temperature of about 200° C. is required to dissolve crystalline forms. For example, amorphous poly(ethylene terephthalate) is completely soluble in methyl alcohol at a temperature of 150° C., whereas the temperature must be raised to about 200° C. in order to dissolve highly crystalline poly(ethylene terephthalate).

The concentration of the polymer in the solvent may vary over a wide range. Suitable concentrations include up to about 60 percent by weight polymer, and preferably about 5 to 30 percent by weight polymer. Although higher concentrations may be employed, it is usually desirable to use polymer concentrations below about 60 percent by weight because of rheological problems. Thus, polymer concentrations above about 60 percent by weight are very viscous and difficult to handle and filter.

Any suitable method for forming solutions may be employed including a batch or continuous operation. Ordinarily, the solution may be formed by placing the solid poly(ethylene terephthalate) along with the volatile solvent in a closed vessel which is then heated above the boiling point of the solvent. The form of the solid polymer to be dissolved is not critical. Thus, fibers, films, powder, pellets, molded pieces, and chunks may be suitably treated by the process of this invention. Although agitation of the solution is not necessary, it is recommended since it will reduce the time necessary to completely dissolve all of the polymer, will help to maintain a constant temperature, and will prevent breakdown of the polymer. It is also preferred to employ the lowest temperature possible for dissolution of the polymer since this will lower the pressure requirements on the vessel and protect the polymer from degradation and contamination. After the polymeric solution is formed, it is preferably filtered while it is still hot to remove solid, insoluble contamination such as dirt or metal that are present in the scrap polymer. The solution is then cooled to precipitate the polymer. This cooling of the solution should be rather slow through that narrow temperature range, usually only a few degrees wide, known as the "precipitation point" or "cloud point" where the polymer that has been dissolved by the solvent separates therefrom and precipitates out. This precipitation point occurs before the enclosed reaction vessel reaches room temperature and while a pressure exists therein. The precipitation of the polymer is complete when the temperature passes through the precipitation or cloud point. At this point, the solvent may be filtered off to remove any contamination which is soluble in the solvent, such as oil or grease. Any suitable filtering means may be used for these two filtering steps. Alternatively, or in addition to the foregoing procedure, the polymer, while it is still in solution, may be filtered through a bed of a solid adsorbent material such as activated charcoal to remove color or other contamination.

The powdered poly(ethylene terephthalate) which is recovered by the process of this invention is clean, homogeneous, and ready for immediate use. The volatile solvents may be easily flashed off and recycled for repeated use with little or no loss. In some instances, there may be a breakdown of molecular weight of the poly(ethylene terephthalate) as indicated by a decrease in inherent viscosity of the polymer after it has undergone the foregoing process. However, the polymer is still active and may be built up to its original or high inherent viscosity in a conventional manner, e.g., by heating in a fluidized bed for various periods of time.

This invention can be further illustrated by the following examples of preferred embodiments, although it will be understood that these examples are included merely for purposes of illustration.

In each of the following examples, the solution formed is maintained free of water, acids, and bases.

EXAMPLE 1

Twenty grams of substantially amorphous poly(ethylene terephthalate) scrap in the form of molded pieces contaminated with dirt particles, as well as oil and grease, and one liter of methyl alcohol are placed in a stainless steel autoclave. The autoclave is sealed, purged with nitrogen, and maintained at a temperature of 170° C. for 2 hours under the autogenous pressure of the solvent of 170° C. The solution is filtered through a sintered metal filter while still hot for removal of insoluble contaminants. Next, the solution is cooled at the superatmospheric autogenous pressure of the solvent and at a constant volume to precipitate the poly(ethylene terephthalate). The methyl alcohol is filtered off on a string or belt continuous filter along with the soluble oil and grease. The residual solvent is flashed off and the resulting poly(ethylene terephthalate) powder is of a high purity suitable for use in a melt extrusion process. The total time of the polymer in solution is 2.5 hours. The inherent viscosity (I.V.) of the powdered polymer is 0.51 compared to the original I.V. of the scrap polymer estimated to be 0.55.

EXAMPLE 2

Example 1 is repeated substituting ethyl alcohol for the methyl alcohol. A homogeneous, poly(ethylene terephthalate) powder of high purity is obtained having an I.V. of 0.53.

EXAMPLE 3

Example 1 is repeated except that fifty milliliters each of normal isopropanol and isopropyl alcohol are used in separate runs with 2.5 grams of the scrap poly(ethylene terephthalate). The polymer in each case is recovered as a substantially pure, finely divided, homogeneous powder. Their combined I.V. is 0.52. This combined powder is fluidized in a fluidized bed for two hours at 230° C. to produce a polyester having an I.V. of 0.82.

Examples 4 and 5 are included to illustrate that conventional non-solvents for poly(ethylene terephthalate) cannot be made to dissolve poly(ethylene terephthalate) by the process of the invention.

EXAMPLE 4

The procedure of Example 1 is duplicated, except that 1 liter of benzene is substituted for the methyl alcohol. No dissolution of the polymer occurs.

EXAMPLE 5

The procedure of Example 1 is again repeated using 1 liter of pentane and 1 liter of cyclohexane respectively in separate runs for the solvent. No dissolution of the poly(ethylene terephthalate) occurs.

The following example is included to show that poly(ethylene terephthalate) is not affected nor dissolved by the solvents of the invention at refluxing temperatures.

EXAMPLE 6

For comparative purposes, 50 milliliters of methyl alcohol, ethyl alcohol, n-propyl alcohol and isopropyl alcohol, respectively, are refluxed in a 100 milliliter round-bottom flask with 2.5 grams of the scrap poly(ethylene terephthalate) of Example 1 for 4 hours. The polymer is not affected nor dissolved by any of the solvents at their refluxing temperatures.

EXAMPLE 7

2.5 grams of poly(ethylene terephthalate) having an I.V. of 0.62 is heat treated for 1.0 hour at 170° C. in an air oven to crystallize the polymer. The crystallized polymer is contaminated with dirt, grease and oil. The contaminated polymer and 50 ml. of ordinary ethyl alcohol (wet) are placed in a stainless steel autoclave. The autoclave is sealed, purged with nitrogen and heated at 200° C. for 4 hours under the autogenous pressure of the solvent at 200° C. The solution is filtered hot through a sintered metal filter to remove insoluble impurities and then cooled at the superatmospheric autogenous pressure of the solvent and at a constant volume to precipitate the polymer.

The ethyl alcohol is filtered off on a string or belt continuous filter to remove soluble and liquid impurities and the resulting clean polymer powder is dried. The I.V. of the polymer is 0.23 indicating molecular breakdown. The powdered polymer is placed in a fluidized bed at 230° C. for 2 hours to produce a polyester having an I.V. of 0.65.

This example illustrates that highly crystalline polyester can be dissolved in the presence of impurities which will cause molecular breakdown but that the resulting polymer is still active and can be built up to the original molecular weight or even higher.

EXAMPLE 8

The procedure of Example 1 is repeated except that the heating period is extended to 24 hours. The polymer is completely degraded at the end of the 24 hours and only the starting monomers are recovered. This example shows that the heating period must be restricted to avoid complete degradation of the polymer.

EXAMPLE 9

2.5 grams of poly(ethylene terephthalate) having an I.V. of 0.62 is heat treated for 1.0 hour at 170° C. in an air oven to crystallize the polymer. The crystallized polymer has an I.V. of 0.58. The crystallized poly(ethylene terephthalate) and 50 ml. of absolute ethyl alcohol (dried) are placed in a stainless steel autoclave. The autoclave is sealed, purged with nitrogen and maintained at a temperature of 200° C. for 2 hours under the autogenous pressure of the solvent at 200° C. The solution is cooled at the superatmospheric autogenous pressure of the solvent and at a constant volume to precipitate the polymer and the ethyl alcohol is filtered off on a string or belt continuous filter. The polymer is recovered as a fine powder having an I.V. of 0.55. This example shows that even highly crystalline poly(ethylene terephthalate) can be dissolved and precipitated using the process without significant degradation of the polymer.

EXAMPLE 10

The procedure of Example 1 is repeated except that 1 liter of ethyl acetate, acetone, isobutyraldehyde and cyclohexane respectively are substituted for the methyl alcohol in separate runs. No dissolution of the poly(ethylene terephthalate) occurs. This example illustrates that other types of oxygenated aliphatic compounds such as esters, ketones and aldehydes are not operable in this process.

Although the invention has been described in considerable detail with reference to certain embodiments, it will be understood that variations and modifications can be effected within the spirit and scope of the invention.

We claim:

1. A process for the recovery of substantially pure poly(ethylene terephthalate) from poly(ethylene terephthalate) contaminated with impurities which comprises dissolving the contaminated poly(ethylene terephthalate) in a closed, sealed container free of water, acid, or bases, at an elevated temperature of from about 150° C. to 200° C. and under superatmospheric pressure for less than about 4 hours in a volatile solvent in which said poly(ethylene terephthalate) is insoluble at ambient temperature but soluble at elevated temperatures, said solvent having an atmospheric boiling point of about 65° C. to about 100° C. and being selected from the group consisting of aliphatic alcohols and mixtures thereof, filtering off impurities, precipitating finely divided poly(ethylene terephthalate) by slowly cooling the resulting solution in said container while maintaining the soluton under superatmospheric pressure and at a substantially constant volume, and recovering said substantially pure poly(ethylene terephthalate) from said solvent.

2. The process of claim 1 wherein the volatile solvent is selected from the group consisting of methyl alcohol, ethyl alcohol, n-propyl alcohol, and isopropyl alcohol.

3. The process of claim 2 wherein the volatile solvent is ethyl alcohol.

4. The process of claim 1 wherein the solution is filtered prior to cooling to remove impurities in said solution.

5 The process of claim 4 wherein the precipitaoed poly(ethylene terephthalate) is recovered by filtering it free of said solution to remove impurities soluble in the solvent.

6. The process of claim 2 wherein the superatmospheric pressure is the autogenous pressure of the solvent at the said temperature.

7. The process of claim 1 wherein said contaminated poly(ethylene terephthalate) is substantially amorphous.

8. The process of claim 7 wherein said elevated temperature is about 170° C.

9. The process of claim 1 wherein said contaminated poly(ethylene terephthalate) is crystalline.

10. The process of claim 9 wherein said elevated temperature is about 200° C.

References Cited

FOREIGN PATENTS 762,690   12/1956   Great Britain _____ 260—2.3

SAMUEL H. BLECH, Primary Examiner

U.S. Cl. X.R.

260—33.4 R